United States Patent

Kessinger

[11] 3,879,654
[45] Apr. 22, 1975

[54] BATTERY CELL TESTER

[75] Inventor: James W. Kessinger, Elizabethtown, Ky.

[73] Assignee: Kessinger Industries, Inc., Elizabethtown, Ky.

[22] Filed: Feb. 23, 1973

[21] Appl. No.: 335,438

[52] U.S. Cl. .......................................... 324/29.5
[51] Int. Cl. ........................................ G01n 27/46
[58] Field of Search .................. 324/29.5; 340/249; 136/182

[56] References Cited
UNITED STATES PATENTS

| 1,586,445 | 5/1926 | Hinkley | 324/29.5 |
| 2,290,559 | 7/1942 | Hitchcock | 324/119 |
| 2,319,152 | 5/1943 | Neely | 136/182 X |
| 3,349,322 | 10/1967 | Lowe | 324/29.5 |

FOREIGN PATENTS OR APPLICATIONS

| 783,727 | 4/1968 | Canada | 324/29.5 |
| 1,070,540 | 6/1967 | United Kingdom | 324/29.5 |

OTHER PUBLICATIONS

"Standard" End-of-Charge Cadmium Voltmeter, Standard Electric Company Inc. (324-29.5).

*Primary Examiner*—Alfred E. Smith
*Assistant Examiner*—Rolf Hille

[57] ABSTRACT

A battery cell tester is provided for testing the condition of wet cell batteries and particularly, wet cell batteries which have a multi-cell construction. The tester is operable to determine the condition of the cells of the battery, by testing across the cell plates of each intermediate cell, and by testing between the positive terminal of the battery and the end cell adjacent thereto. The tester includes a pair of probes which are connected in circuit relationship with a solid state circuit means, the latter being housed in a case formed of suitable insulation material along with a meter with which the solid state circuit means is connected in circuit. Each of the probes embodies a single electrode with at least a portion of each electrode being exposed. At least one of the probes is supported for movement relative to the case of the tester. The solid state circuit means comprises a plurality of diodes, a resistor and a calibration potentiometer all connected in circuit together and all mounted on the same printed circuit board.

7 Claims, 4 Drawing Figures

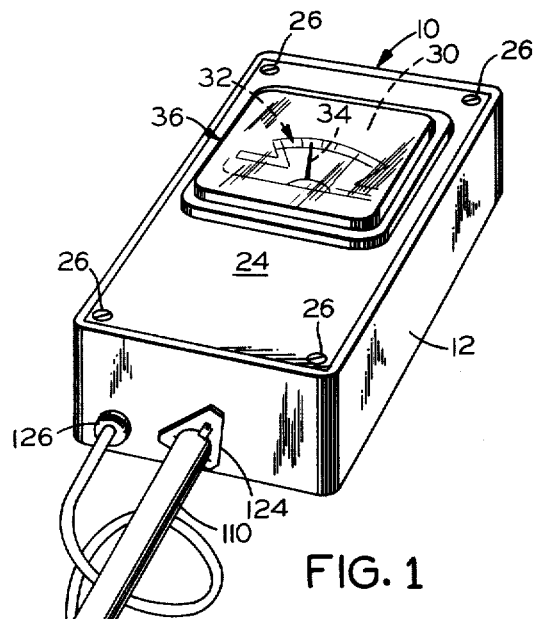
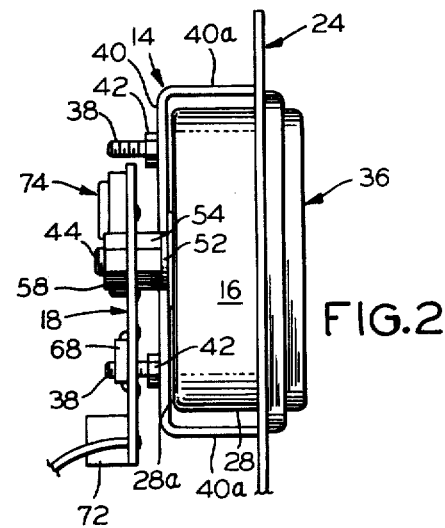
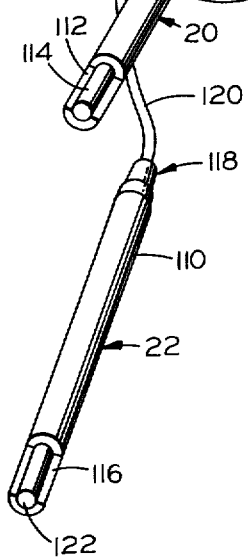
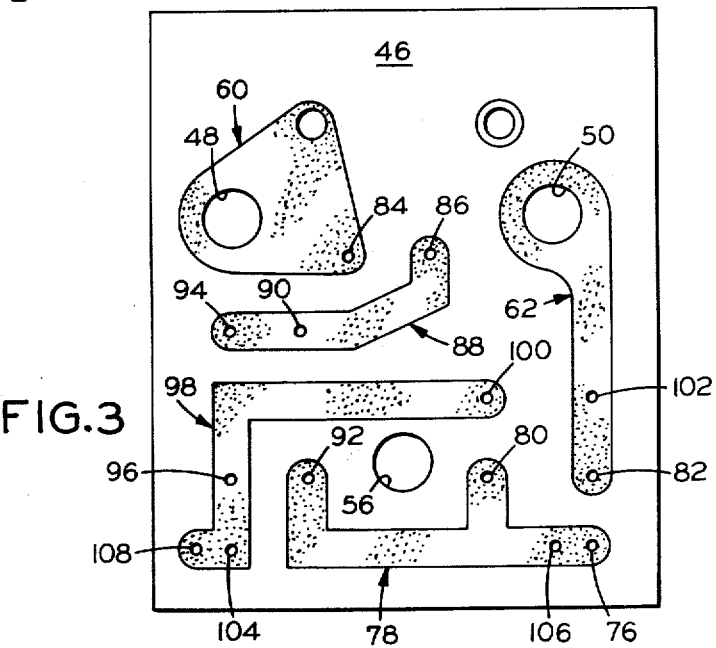
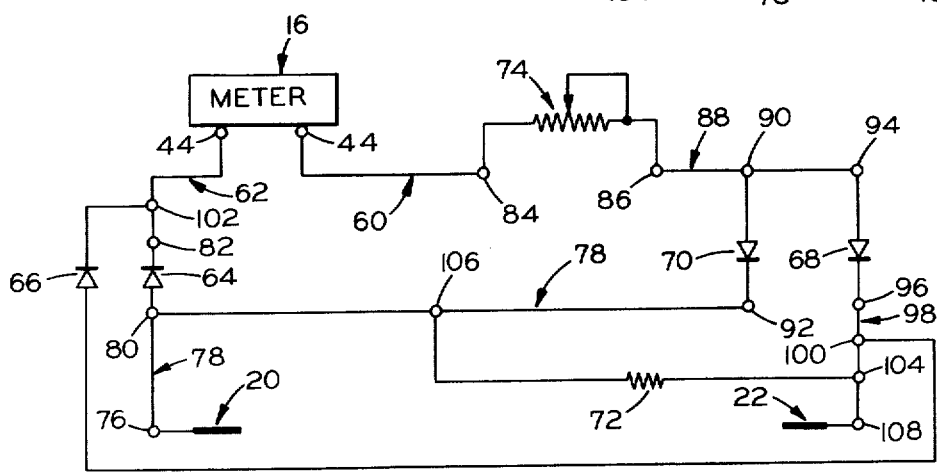

3,879,654

BATTERY CELL TESTER

BACKGROUND OF THE INVENTION

There have been provided in the prior art through the years a variety of different types of means which are adapted to be employed for purposes of testing the condition of a battery. One manner of classifying the various types of battery testers, which have been known heretofore in the prior art, is by the complexity of their structure and/or their relative cost of manufacture. Thus, for example, probably one of the simplest forms of testing means which has been employed previously for testing the condition of a battery is the type which resembles an eye dropper in structure. More specifically, this type of battery tester commonly consists of a short glass tube which is fitted at one end with a rubber bulb and the other end of which is open. The rubber bulb is operable to cause liquid to be "sucked" into the glass tube and thereafter ejected from the tube in a drop-by-drop fashion. A plurality of small round objects are supported in the glass tube for movement along the length thereof and relative to each other. In accordance with the mode of operation of this type of device, each cell of a battery is tested by inserting the open end of the dropper into the electrolyte in the cell, and the rubber bulb is then manipulated to cause some of the electrolyte to be drawn into the tube. The extent to which the small round objects are suspended in the electrolyte in the glass tube provides an indication of the condition of that particular cell of the battery. Each cell of the battery is tested in similar fashion. This type of device is intended to provide only a relatively coarse indication of the condition of the battery. In the event that one or more of the cells of the battery appear to be deficient, based on the test conducted thereon through the use of the aforedescribed device, then it is intended that a further check be made of the apparently defective cell or cells utilizing a more sophisticated form of battery tester.

Another form of battery tester, embodying a more complex structure than the dropper type described above which has also been employed previously, consists of a device which in structure as well as mode of operation resembles a conventional voltmeter. The basic functional components of this device comprise a pair of leads, circuit means connected in circuit relationship with the leads and operable to measure voltage and a suitably calibrated scale connected in circuit relationship with the circuit means and the leads, and adapted to provide a reading of the voltage measured across the aforementioned pair of leads. To employ the device to test the condition of a battery, one of the leads of the device is connected to one of the battery terminals, and the other lead is connected to the other terminal of the battery. With the leads so connected, a reading can be obtained from the scale of the device indicating the voltage which is present across the terminals of the battery.

In addition to the above types of battery testers which have been available in the prior art heretofore there also exists a number of other different forms of battery testers which are characterized by the fact that they embody relatively complex structures. Battery testers of the latter type have commonly been found employed in automotive garages and/or other types of automotive repair facilities. One advantage possessed by the latter type of battery tester resides in the fact that through the use thereof one is capable of obtaining a determination of the condition of a battery with a high degree of accuracy. On the other hand, disadvantages of this type of battery tester are that by virtue of its complex structure and relatively high cost it is in general limited to being employed in automotive repair shops.

Thus, although a variety of different types of battery testers have been developed previously, there nevertheless has still existed a need for providing a battery tester which is adapted to provide a more accurate determination of the condition of a battery than that obtainable through the use of the aforedescribed dropper type of battery tester, which unlike most of the voltmeter-like battery testers is capable of being used to test the condition of each separate cell of a multi-cell battery and also does not embody some of the other limitations of a voltmeter-like tester such as the requirement thereof of maintaining correct polarity, etc., and which is less complex in structure and significantly less costly than the battery testers commonly utilized by automotive repair facilities.

Accordingly, it is an object of the present invention to provide a battery cell tester particularly adapted for use with wet cell batteries which is operable to test, with a relatively high degree of accuracy, the present condition of a battery by testing the condition of each independent cell thereof.

It is also an object of the present invention to provide such a battery cell tester which can also be employed to determine whether a short or a drain exists in a battery.

It is another object of the present invention to provide such a battery cell tester which moreover can be employed for checking the condition of a voltage regulator connected in circuit with a battery.

It is still another object of the present invention to provide such a battery cell tester which in addition can be employed while a battery is being charged to test the battery's ability to take and hold a charge.

A further object of the present invention is to provide such a battery cell tester which has a relatively simple structure and which is relatively inexpensive to manufacture.

A still further object of the present invention is to provide such a battery cell tester which is not polarity sensitive.

Yet another object of the present invention is to provide such a battery cell tester wherein the same battery cell tester is capable of being employed to test 6 volt, 12 volt and 24 volt batteries.

Yet still another object of the present invention is to provide a simple and yet fast method of accurately determining the existing condition of a battery.

SUMMARY OF THE INVENTION

It has now been found that the foregoing and related objects can be readily attained in a battery cell tester which is particularly adapted for testing the existing condition of a battery by testing each of the individual cells thereof. The battery cell tester comprises a housing consisting of a case formed substantially entirely of a non-metallic material. A pair of probe units are mechanically connected to the case. Each of the probe units includes a shield and a separate electrode supported within the shield. The shield is provided with a cut-away portion whereby with the electrode supported within the shield a portion of the electrode is exposed thereby enabling an electrical connection to be made directly with the electrode through the exposed portion thereof. Within the case a circuit means is mounted. The circuit means is connected electrically in circuit relationship with the pair of probe units and is operable to determine the difference in voltage existing between two points with which the pair of probe units are placed in contact. In addition, a display means is also mounted in the case. The display means is connected electrically in circuit relationship with the circuit means, and is operable to provide a visual indication of the difference in voltage existing between two points as determined by the circuit means.

In accordance with the preferred embodiment of the invention, the case of the battery cell tester is formed from a high impact plastic and includes a face plate also made of the same type of material. One of the probe units is fixedly secured to one end wall of the tester, while the other probe unit comprises a movable unit which is connected to the tester case by means of a suitable length of wire. The circuit means comprises a plurality of germanium diodes, a resistor and a calibration potentiometer all electrically connected in circuit relationship and mounted on a printed circuit board. The elements comprising the circuit means are connected in circuit in such a manner as to provide a tester which is not polarity sensitive. The display means comprises a meter having a scale depicted thereon and an indicator supported for movement between the ends of the scale. By observing the position of the movable indicator relative to the scale of the meter, a reading in volts can be obtained of the voltage difference existing between the two points with which the pair of probe units are in contact.

Certain objects of the invention may be attained in accordance with the method wherein the condition of a battery is determined through the use of a battery cell tester to test the condition of each individual cell of the battery. In accord with this method, testing is performed by placing probe units in the cell openings of the battery whereby testing is always performed on the cell plates between the probe units. More specifically, beginning on the negative side of the battery, the testing is accomplished by placing one probe unit in the first cell opening and the other probe unit in the second cell opening. The condition of the cell being tested is indicated on the meter. To test the next cell, the probe unit which was in the first cell opening is placed in the second cell opening, and the other probe unit which was in the second cell opening is placed in the third cell opening. By again observing the meter of the tester, a reading of the condition of the second set of cell plates is obtained. This step-by-step movement of the probe units is continued until the last cell opening on the positive side of the battery is reached. In order to obtain a reading of the condition of the cell plates between the last cell opening and the positive terminal, one probe unit is placed in the last cell opening and the other probe unit is touched to the positive post of the battery. The reading which then appears on the meter of the tester indicates the condition of the last set of cell plates. With the completion of the above steps, all of the individual cells have now been tested and from the results of the readings obtained for each individual cell of the battery, there is provided an indication of the existing condition of the battery.

BRIEF DESCRIPTION OF THE DRAWINGS

FIG. 1 is a perspective view of a battery cell tester constructed in accordance with the present invention;

FIG. 2 is a partial side elevational view of the battery cell tester of FIG. 1 without the case, illustrating the manner in which the meter and the electrical circuitry of the tester are assembled together for mounting in the case in accordance with the present invention;

FIG. 3 is a plan view of the printed circuit board on which the circuitry of a battery cell tester constructed in accordance with the present invention is mounted; and FIG. 4 is a schematic electrical circuit diagram of the circuitry of a battery cell tester constructed in accordance with the present invention.

DETAILED DESCRIPTION OF THE ILLUSTRATED EMBODIMENT

Referring now to FIG. 1 of the drawings, there is illustrated therein a battery cell tester, generally designated by reference numeral 10, constructed in accordance with the present invention. The tester 10 comprises a case 12 in which there is mounted an assembly 14 including a meter 16 and a circuit means 18, the latter assembly being shown in FIG. 2 of the drawings, and to which a pair of probe units 20 and 22 are mechanically connected in a manner to be set forth in more detail hereinafter. The case 12 is generally rectangular in configuration and is preferably formed as an integral member having one open side through which access may be had to the interior of the case 12. For closing the aforementioned open side of the case 12, there is provided a face plate 24, having dimensions corresponding to the dimensions of the open side of the case 12, which is adapted to be detachably secured to the case 12 by means of suitable fasteners 26 which are received in openings (not shown) provided for this purpose in both the case 12 and the face plate 24. In accordance with the preferred embodiment of the invention, the case 12 as well as face plate 24 are both made of a non-electrically conductive material such as a conventional high impact plastic. The face plate 24 is provided with a circular opening, not visible in the drawings, which is formed off center of the midpoint of the long axis of the face plate 24. The meter 16 as will be referred to in greater detail subsequently projects through this opening, the latter being suitably dimensioned to permit this use thereof, in the face plate 24 whereby the face of the meter 16 is visible.

Turning now to a description of FIG. 2 of the drawings, there is illustrated therein the assembly 14 which includes the meter 16 and the circuit means 18, the latter being both mechanically and electrically connected to the meter 16 as will be described with particularity hereinbelow. The meter 16 which is employed in the battery cell tester 10 is a meter of conventional type, but having a particularly resistance range. In this regard, in accord with the preferred embodiment of the invention, the meter 16 which is employed has a basic movement of 0–10MA, and an internal resistance of 300± 10 OHMS.

The meter 16 has a generally circular body portion 28 the dimensions of which correspond to those of the aforementioned opening in the face plate 24. A substantially square-shaped face member 30 is mounted to the body portion 28. The face member 30 bears indicia 32 on its outer surface which are arranged thereon to form a scale calibrated in volts. The meter 16 in addition, in a manner well known to those skilled in the art, is provided with an indicator 34 which is connected to the circuitry (not shown) housed within the body portion 28 of the meter 16, and which is suitably supported for movement in a plane parallel to and spaced from the plane in which the indicia 32 lies. Overlying the face member 30 and affixed thereto by suitable securing means (not shown) such as through the use of an adhesive there is provided a transparent cover 36 preferably formed of a clear plastic, but which, if so desired, could also be made from a different material such as glass.

With reference further to FIG. 2 of the drawings, a pair of mounting studs 38 are secured to and project outwardly from the bottom 28a of the base portion 28. The mounting studs 38 which extend generally perpendicular to the bottom 28a of base portion 28 are suitably spaced relative to each other whereby to be receivable within a pair of openings (not shown) provided for this purpose in a substantially U-shaped mounting bracket 40. The mounting studs 38 and the mounting bracket 40 provide a means of assembling the meter 16 to the face plate 24. More particularly, to mount the meter 16 to the face plate 24, the base portion 28 of the meter 16 is first inserted through the opening provided therefor in the face plate 24 until the undersurface of the face member 30 to which the cover 36 is affixed engages the rim surrounding the opening in the face plate 24. The face member 30 is intentially designed so as to have larger dimensions than those of the opening in the face plate 24 whereby to enable the face plate 24 to function in the aforedescribed manner as a stop thereby preventing the meter 16 from passing entirely through the face plate 24 and also ensuring the proper alignment of the face member 30 of the meter 16 relative to the face plate 24. With the meter 16 so positioned relative to the face plate 24, the U-shaped mounting bracket 40 is employed for purposes of securing the meter 16 in place. More specifically, the U-shaped mounting bracket 40 is placed over the base portion 28 of the meter 16, in the manner depicted in FIG. 2 of the drawings, wherein the legs 40a of the bracket 40 abut against the undersurface of the face plate 24 and so that the mounting studs 38 project through the openings (not shown) provided therefor in the bracket 40. Thererafter, nuts 42 are threaded on the studs 38 and are tightened against the bracket 40 whereby during tightening the legs 40a of bracket 40 are secured in abutting engagement with the undersurface of the face plate 24 and the frame member 30 and cover 36 of the meter 16 are drawn tightly against the front surface of face plate 24. It is, of course, to be understood that in order to function in the aforedescribed manner, the nuts 42 each have a diameter which is greater in dimension than the diameter in the openings (not shown) provided in the bracket 40 for receiving the studs 38.

In addition to the mounting studs 38, the bottom 28a of the base portion 28 of the meter 16 is also provided with another pair of studs 44, only one of which is shown in the drawings. The latter pair of studs 44 are employed for purposes of mechanically and electrically connecting the circuit means 18 to the meter 16. The circuit means 18 as will be described more fully hereinafter includes a printed circuit board 46 on which a plurality of different types of electrical components are mounted. As illustrated in FIG. 3 of the drawings, the printed circuit board 46 includes a pair of openings 48 and 50 which are suitably spaced relative to each other and the diameter of which is such that the studs 44 described above are capable of being received therein. Although not shown in the drawings, the studs 44 in the conventional manner well known to those skilled in the art are connected in electrical circuit within the base portion 28 of the meter 16 with the circuitry (not shown) housed therein whereby the studs 44 in addition to their mounting function also constitute a pair of electrical terminals for the meter 16. In accord with the preferred embodiment of the invention, each of the studs 44 is provided with a washer 52 and a nut 54, the latter being threaded onto the stud 44 in the manner depicted in FIG. 2 of the drawings. Then, for purposes of mounting the printed circuit board 46 to the meter 16 to form the assembly 14, the printed circuit board 46 is positioned relative to the base portion 28 of the meter 16 so that the studs 44 are received in the openings 48 and 50 and so that the back surface of the printed circuit board 46 abuts against the nuts 54. A clearance hole 56 is formed in the printed circuit board 46 to permit the lower stud 38, as viewed with reference to FIG. 2 of the drawings, to pass therethrough without engagement therewith when the printed circuit board is mounted on the studs 44 as above described. With the printed circuit board 46 so positioned on the studs 44, a second nut 58 is threaded on to each of the studs 44 and is tightened thereon whereby the printed circuit board 46 is captured between the nuts 54 and the nuts 58, thereby mechanically connecting the printed circuit board 46 to the meter 16. The nuts 54 also function to space the printed circuit board 46 from the base portion 28 of the meter 16 whereby to provide electrical clearance therebetween. It is, of course, understood that in order to accomplish the above described assembly of the printed circuit board 46 to the meter 16 the nuts 54 and 58 are each dimensioned so as to have a diameter which is greater than that of the openings 48 and 50.

With regard next to the manner in which the electrical connection is accomplished between the printed circuit board 46 and the meter 16, the printed circuit board 46, in accordance with conventional practice, has an insulating surface on a plurality of areas of which an electrically conductive material has been deposited. More particularly, as shown in FIG. 3 of the drawings, the areas 60 and 62 on printed circuit board 46 surrounding the openings 48 and 50, respectively, are provided with deposits of an electrically conductive material. Thus, when the printed circuit board 46 is captured on the studs 44 as shown in FIG. 2 of the drawings, the nuts 54 are in contact with the electrically conductive areas 60 and 62. Consequently, an electrical circuit is therefor established from the electrically conductive area 60 through the nut 54 which is threaded on the stud 44 received in the opening 48 to the latter stud 44, which as set forth previously comprises an electrical terminal for the meter 16, to the electrical circuitry (not shown) housed in the base portion 28 of the meter 16 and therefrom to the other stud 44 connected therewith which is positioned within the opening 50 and from the latter stud 44 through the other nut 54 which is threaded thereon to the electrically conductive area 62.

Continuing now with a description of the circuit means 18, reference will be had for this purpose to FIGS. 3 and 4 of the drawings. The circuit means 18 in accord with the preferred embodiment of the invention includes four germanium diodes 64, 66, 68 and 70, a 100,000 OHM resistor 72, and a calibration potentiometer 74 having a variable 100 OHM value. Although the diodes 64, 66, 68 and 70, the resistor 72 and the calibration potentiometer 74 have not been depicted mounted on printed circuit board 46 in FIG. 3 of the drawings in the interest of clarity of illustration, it is to be understood that all of these components as partially shown in FIG. 2 of the drawings are all mounted on the printed circuit board 46 and are electrically connected in circuit relationship as illustrated in the schematic circuit diagram shown in FIG. 4 of the drawings.

Referring to the schematic wiring diagram of FIG. 4, a description will now be set forth of the electrical circuit shown therein. For ease of understanding, the reference numerals which are used in FIG. 4 of the drawings to designate the different junctions to which the electrical components of the circuit means 18 are connected also appear in FIG. 3 wherein these reference numerals designate the holes in the electrically conductive material of the printed circuit board 46 through which the leads of the various electrical components project thereby to establish, when the leads are soldered in place an electrical connection between the electrical components and the electrically conductive material of the printed circuit board 46. As illustrated in FIG. 4, the probe unit 20 is connected to junciton 76 the latter in turn being connected through bus 78 to the junction 80. The diode 64 is connected between junction 80 and bus 82, the latter being connected by bus 84 to one of the terminals 44 of meter 16. The other terminal 44 of the meter 16 is connected by bus 60 to junction 84, and therethrough to one side of the calibration potentiometer 74. The other side of calibration potentiometer 74 is connected through junction 86 to bus 88. Diode 70 is connected to bus 88 through junction 90 and through junction 92 and bus 78 to junction 80. Similarly, diode 68 by means of junction 94 is also connected to bus 88, and by junction 96 to bus 78. The diode 66 is connected through junction 100 to bus 98 and through junction 102 to bus 62. One side of the resistor 72 is connected through junction 104 to the bus 98 and through junction 106 to bus 78. Finally, as seen in FIG. 4, the other probe unit 22 is connected through junction 108 to bus 98. it is to be noted that by virtue of the manner in which the diodes 64, 66, 68 and 70 are connected in circuit relation with the probe units 20 and 22, the terminals 44 of the meter 16, the resistor 72 and the calibration potentiometer 74, the battery cell tester 10 is not polarity sensitive.

With reference now to the construction of the probe units 20 and 22 depicted in FIG. 1 of the drawings, in accordance with the preferred embodiment of the invention, the probe unit 20 preferably is fixedly attached to the case 12 while probe unit 22 is movable relative thereto. Insofar as concerns their structure however, the probe units 20 and 22 are of identical construction. More particularly, each of the probe units 20 and 22 include a sleeve member 110 which preferably comprises a relatively short length of a paper base phenolic tubing. The sleeve member 110 of fixed probe unit 20 has threads (not shown) machined therein at one end thereof whereby to enable the probe unit 20 to be fastened to the case 12 as will be described more fully hereinafter. The other end of the sleeve member 110 of fixed probe unit 20 is cut away to provide a notch 112 therein. A probe tip 114 having an 18 gauge, 5,000 volt rated wire (not shown) attached by soldering to one end thereof is supported within the sleeve member 110 of fixed probe unit 20. More particularly, the probe tip 114 is press fitted into the end of the sleeve member 110 which is provided with the notch 112 in such a manner that approximately one-half of the length of the probe tip 114 is exposed by the notch 112 and the other one-half of the probe tip 114 is positioned within the sleeve member 110. In accordance with the preferred form of the invention, the probe tip 114 preferably has a length of approximately one inch, and it has a hole (not shown) drilled in one end thereof to allow the aforedescribed solder connection to the lead wire to be made thereto. The probe tip 114 is preferably made from Type 12 L-14 ledloy steel and is cadmium plated.

Insofar as concerns the movable probe unit 22, the latter has a construction which is identical to the construction of the fixed probe unit 20 and is made of the same materials except that, whereas one end of the sleeve member 110 of the fixed probe unit 20 has threads machined thereon, the sleeve member 110 of the movable probe unit 22 is not provided with any such threads. Thus, one end of the sleeve member 110 of the movable probe unit 22 is cut away to form a notch 116 therein while the other end of the sleeve member 110 of the movable probe unit 22 is provided with support means 118 for supporting the lead wire 120 which passes therethrough. One end of the lead wire 120 is soldered to the probe tip 122 in the same manner as set forth previously in connection with the description of probe tip 114. The other end of lead wire 120 is connected to the printed circuit board 46 as schematically depicted in the schematic circuit diagram illustrated in FIG. 4 of the drawings. Probe tip 122 is assembled in the sleeve member 110 of the movable probe unit 22 in the same manner as the probe tip 114 is assembled in the sleeve member 110 of the fixed probe unit 20, i.e., so that approximately one-half of the length of the probe tip 122 is exposed by the notch 116 while the other half of the length of the probe tip 122 is positioned within the sleeve member 110 of the movable probe unit.

The fixed probe unit 20, in accordance with the illustrated embodiment of the invention, is attached to the case 12 of the battery cell tester 10 by means of a truarc ring 124 which is screwed down on a threaded end of the sleeve member 110. The threaded sleeve end of sleeve member 120 of fixed probe unit 20 is passed through a hole (not shown) threaded for this purpose in the case 12 and is held in place on the inside of the case 12 by a suitable nut (not shown).

The movable probe unit 22 is attached to the tester case 12 by means of lead wire 120. The latter wire 120, in accordance with the illustrated embodiment of the invention, comprises a 16 inch, 18 gauge, 5,000 volt wire which is connected at one end to the printed circuit board 46 and which runs through the sleeve member 110 of the movable probe unit 22 and is soldered to the probe tip 122 as described above. To accomplish the connection of lead wire 120 to the printed circuit board 46 and the sleeve member 110 of the movable probe unit 22, the lead wire 120 passes through a suitably sized hole (not shown) provided for this purpose in the case 12 of the battery cell tester 10. A vinyl grommet 126 is preferably positioned in the aforedescribed hole such as to hold the lead wire 120 snugly in place as it passes through the side wall of the case 12. After the lead wire 120 is attached in the aforedescribed manner, there is approximately 10 inches of the wire 120 which is free between the point where the wire 120 enters the sleeve member 110 of the movable probe unit 22 and the point where the wire 120 passes through the grommet 126, which allows movement of the movable probe unit 22 during performance of test with the battery cell tester 10.

Turning now to a consideration of the method of use of the battery cell tester 10, there are four separate types of tests which may be performed utilizing the tester 10. First, the battery cell tester 10 is operable to test the condition of a battery by performing a test on the cell plates of each cell of the battery. To perform the test, the probe units 20 and 22 are placed in the cell openings of the battery being tested. Therefore, the test is always being performed on the cell plates located between the probe units 20 and 22. The specific steps to be followed in performing this test are as follows. Beginning on the negative side of the battery, one of the probe units 20, 22 is placed in the first cell opening of the battery and the other of the probe units 20, 22 is placed in the second cell opening of the battery. The meter 16 now indicates the condition of the cell of the battery being tested. In this regard, the indicia 32 on the face member 30 of the meter 16 preferably includes the following legends: DEAD, DISCHARGED, CHARGED, and OVERLOAD in addition to a scale calibrated in volts. Thus, by observing during a test the legend to which the indicator, i.e., pointer 34 is pointing, an indication is provided thereby of the condition of the cell of the battery being tested. The battery cell tester 10 is then moved so that the probe unit which was in the first cell is placed in the second cell, and the probe unit which was in the second cell is placed in the third cell. By observing the meter 16 again, the condition of the second set of cell plates can be determined from the scale on the face member 30. This step-by-step movement of the probe units 20 and 22 is continued until the last cell opening on the positive side of the battery is reached. In order to test the cell plates between the cell opening and the positive terminal of the battery, one of the probe units 20,22 is placed in the last cell opening and the other of the probe units 20,22 is touched to the positive terminal of the battery. When the latter test has been made and the reading on the meter recorded, all of the individual cells of the battery have been tested. Accordingly, from the results obtained by testing each of the separate cells of the battery, an indication is provided of the condition of the battery itself.

The second type of test capable of being performed by the battery tester is a short or drain test of the battery. The procedure to be followed in performing this test is the same as that set forth for the test described in the preceding paragraph except that the probe units 20 and 22 are placed in every other cell opening of the battery. More particularly, to perform this test on a six-cell battery for example, one of the probe units 20,22 is placed in the first cell opening of the battery and the other of the probe units 20,22 is placed in the third cell opening of the battery, both as beginning from the negative side of the battery; the reading on the meter 16 in this placement of the probes is observed. Then, the probe unit which was in the first cell opening is placed in the second cell opening, and the probe unit which was in the third cell opening is placed in the fourth cell opening; the reading on the meter 16 is observed. Next the probe unit which was in the second cell opening is placed in the third cell opening and the probe unit which was in the fourth cell opening is placed in the fifth cell opening, and the reading on the meter 16 is observed. Finally, the probe units 20,22 are moved from the third and fifth cell openings to the fourth and sixth cell openings, and the reading on the meter 16 is observed. To test the last set of cell plates, one of the probe units 20,22 is placed in the fifth cell opening and the other of the probe units 20,22 is touched to the positive terminal of the battery, and the reading appearing on the meter 16 is observed. This completes the test. Normal readings in this test are 4–4.5 volts. If any one of the separate readings obtained during the above described testing indicates a sharp drop in voltage, this suggests the existence of a faulty set of cell plates. Drops of 0.2 volts across the entire battery are common and only show aging. However, a drop across the battery of 0.5 volts or more show a drain is occurring. For example, if the following test readings: 4.4 V., 4.3 V., 4.0 V., 3.8 V., and 3.5 V. are obtained, since the difference across the battery exceeds 0.5 V., this would indicate that a drain was occurring.

The battery cell tester 10 can also be utilized to check the condition of a voltage regulator connected electrically in a circuit with the battery. To perform this third type of test, one of the probe units 20,22 is placed in the last cell opening on the positive side of the battery, and the other of the probe units 20,22 is placed in contact with the positive terminal of the battery. The engine is then started, and the reading on the meter 16 is observed. The reading should be in the 1.8–2.2 volt range while the engine is running at idle speed. If a different reading is obtained, this indicates that the voltage regularor is defective.

The fourth type of test which can be performed by utilizing the battery cell tester 10 is a test of a battery's ability to take and hold a charge. To perform this check, each of the three tests described in the preceding three paragraphs is performed while the battery is being charged. The readings which appear on the face member 30 of the meter 16 indicate the battery's ability to hold and take a charge, and does not signify the charge being put into the battery.

Although only one embodiment of a battery cell tester constructed in accordance with the present invention has been shown in the drawings and described hereinabove, it is to be understood that modifications in the construction thereof may be made thereto by those skilled in the art without departing from the essence of the invention. In this connection some of the modifications which can be made in the battery cell tester 10 have been alluded to hereinabove while others will become readily apparent to those skilled in the art when exposed to the present description and illustration of the constuction of the battery cell tester 10. In this regard, the case 12 and face plate 24 can for example also be formed from other types of material other than that described hereinabove as long as the necessary insulation of the electrical circuitry housed therein is provided for. However, it should be noted that there are several advantages which are derived from employing the specific structural construction of the preferred embodiment of the battery cell tester 10. For example, with respect specifically to the probe units 20 and 22, by utilizing probe units constructed such that the probe tips thereof are shielded, i.e., only a relatively small portion thereof is exposed, the probe units 20 and 22 of the battery cell tester 10 are not susceptible to providing erroneous readings which are quite often obtained when unshielded probe units are employed. Generally, such erroneous readings are caused by the unshielded probe units touching one of the cell plates, or because erosion, etc. has occurred in the cell opening. Other advantages of the battery cell tester 10 stem from the specific form of circuit means 18 embodied therein such as the fact that the tester 10 has the inherent capability of being calibrated and is not sensitive to polarity. Also, as noted previously, the electrical circuitry of the battery cell tester 10 is insulated in such a manner as to isolate the operator from accidentally contacting any current-carrying components. In addition, the material from which the probe tips in particular and the probe units in general are made are not readily susceptible to deterioration from exposure to battery acid and therefore function to provide a battery cell tester 10 which is characterized by its relatively long operating life. Finally, although the battery cell tester 10 is particularly adapted for use in testing the condition of multi-celled wet cell batteries, it can also be used to test the condition of dry cell batteries as long as the rating of the latter batteries fall within the testing range of the battery cell tester 10.

Thus, it can be seen that the present invention provides a novel and improved battery cell tester particularly adapted for use with wet cell batteries which is operable to test, with a relatively high degree of accuracy, the present condition of a battery by testing the condition of each independent cell thereof. The battery cell tester of the present invention can also be employed to determine whether a short or a drain exists in a battery. Moreover, in accord with the present invention a battery cell tester has been provided which in addition can be employed for checking the condition of a voltage regulator connected in circuit with a battery. The battery cell tester of the present invention furthermore can be employed while a battery is being charged to test the battery's ability to take and hold a charge. In accordance with the present invention there has been provided a battery cell tester which has a relatively simple structure and which is relatively inexpensive to manufacture. In addition, the battery cell tester of the present invention is characterized by the fact that it is not polarity sensitive and is capable of being employed to test 6 volt, 12 volt and 24 volt batteries. Finally, in accordance with the present invention there has been provided a simple and fast method of accurately determining the existing condition of a battery.

Having thus described the invention, I claim:

1. A multi-purpose battery tester comprising:
   a. a housing including a case;
   b. a pair of probe units connected mechanically to said case and operable for performing four independent tests on a battery by varying the points of engagement of said pair of probe units with the battery;
   c. circuit means mounted within said case electrically connected in circuit relationship with said pair of probe units and operable to determine alternately the condition of the individual cells of a battery when said pair of probe units are inserted successively into adjacent pairs of cells of the battery, the short or drain condition of the battery when said pair of probe units are inserted successively into pairs of alternate cell openings of the battery, the condition of a voltage regulator connected in electrical circuit with a battery when one of said pair of probe units is inserted into the cell opening nearest the positive terminal of the battery and the other of said pair of probe units is touched to the positive terminal of the battery and the ability of a battery to take a charge by repeating each of the three preceding tests while the battery is being charged, said circuit means including a first pair of diodes connected in circuit relation with one of said pair of probe units, a calibration potentiometer having one side thereof connected in circuit relation with said first pair of diodes, a second pair of diodes connected in circuit relation with the other side of said calibration potentiometer and to the other of said pair of probe units, and a resistor connected in circuit relation between said pair of probe units, said first and second pairs of diodes, said resistor and said calibration potentiometer all being mounted on a printed circuit board and connected in circuit relation therewith so as to provide a battery cell tester with a circuit insensitive to polarity; and
   d. display means mounted in said case electrically connected in circuit relationship with said circuit means, said display means comprising a meter having one side thereof connected in circuit relation with said first pair of diodes and the other side thereof connected in series circuit relation with said one side of said calibration potentiometer, said meter being operable to provide alternately a visual indication of the results of each of the four independent tests performed on a battery with the battery tester as determined by said circuit means.

2. The multi-purpose battery tester as set forth in claim 1 wherein said housing is formed substantially entirely of a non-metallic material, and further including on said case a face plate and fastening means for detachably securing said face plate to said case.

3. The multi-purpose battery cell tester as set forth in claim 1 wherein one of said probe units is fixedly attached to said case and the other of said pair of probe units is connected by wire means to said case whereby said other of said probe units is movable relative to said case when tests are being performed with the battery cell tester.

4. The multi-purpose battery cell tester as set forth in claim 1 wherein said meter includes a face member having indicia thereon calibrated in volts and including the legends DEAD, DISCHARGED, CHARGED and OVERLOAD, and said meter further includes an indicator supported for movement in a plane parallel to and spaced from said face member.

5. A multi-purpose battery tester comprising:
   a. a housing including a case;
   b. a pair of probe units connected mechanically to said case and operable for performing four independent tests on a battery by varying the points of engagement of said pair of probe units with the battery, each of said pair of probe units having a shield with a cut-away portion and a separate electrode supported within said shield with the cut-away portion of said shield exposing a portion of said electrode thereby enabling an electrical connection to be made directly with said electrode through the exposed portion thereof, one of said pair of probe units being fixedly attached to said housing and the other of said pair of probe units being connected by wire means to said housing whereby said other of said probe units is movable relative to said housing when tests are being performed with the battery cell tester;

c. circuit means mounted within said case electrically connected in circuit relationship with said pair of probe units and operable to determine alternately the condition of the individual cells of a battery when said pair of probe units are inserted successively into adjacent pairs of cells of the battery, the short or drain condition of the battery when said pair of probe units are inserted successively into pairs of alternate cell openings of the battery, the condition of a voltage regulator connected in electrical circuit with a battery when one of said pair of probe units is inserted into the cell opening nearest the positive terminal of the battery and the other of said pair of probe units is touched to the positive terminal of the battery and the ability of a battery to take a charge by repeating each of the three preceding tests while the battery is being charged, said circuit means including a first pair of diodes connected in circuit relation with one of said pair of probe units, a calibration potentiometer having one side thereof connected in circuit relation with said first pair of diodes, a second pair of diodes connected in circuit relation with the other side of said calibration potentiometer and to the other of said pair of probe units, and a resistor connected in circuit relation between said pair of probe units, said first and second pairs of diodes, said resistor and said calibration potentiometer all being mounted on a printed circuit board and connected in circuit relation therewith so as to provide a battery cell tester with a circuit insensitive to polarity; and d. display means mounted in said case electrically connected in circuit relationship with said circuit means, said display means comprising a meter having one side thereof connected in circuit relation with said first pair of diodes and the other side thereof connected in series circuit relation with said one side of said calibration potentiometer, said meter being operable to provide alternately a visual indication of the results of each of the four independent tests performed on a battery with the battery tester as determined by said circuit means.

6. The multi-purpose battery cell tester as set forth in claim 5 wherein said housing is of two-part construction and includes a case, a face plate and fastening means for detachably securing said face plate to said case.

7. The multi-purpose battery cell tester as set forth in claim 5 wherein said meter includes a face member having indicia thereon calibrated in volts and including the legends DEAD, DISCHARGED, CHARGED and OVERLOAD, and said meter further includes an indicator supported for movement in a plane parallel to and spaced from said face member.

* * * * *